UNITED STATES PATENT OFFICE.

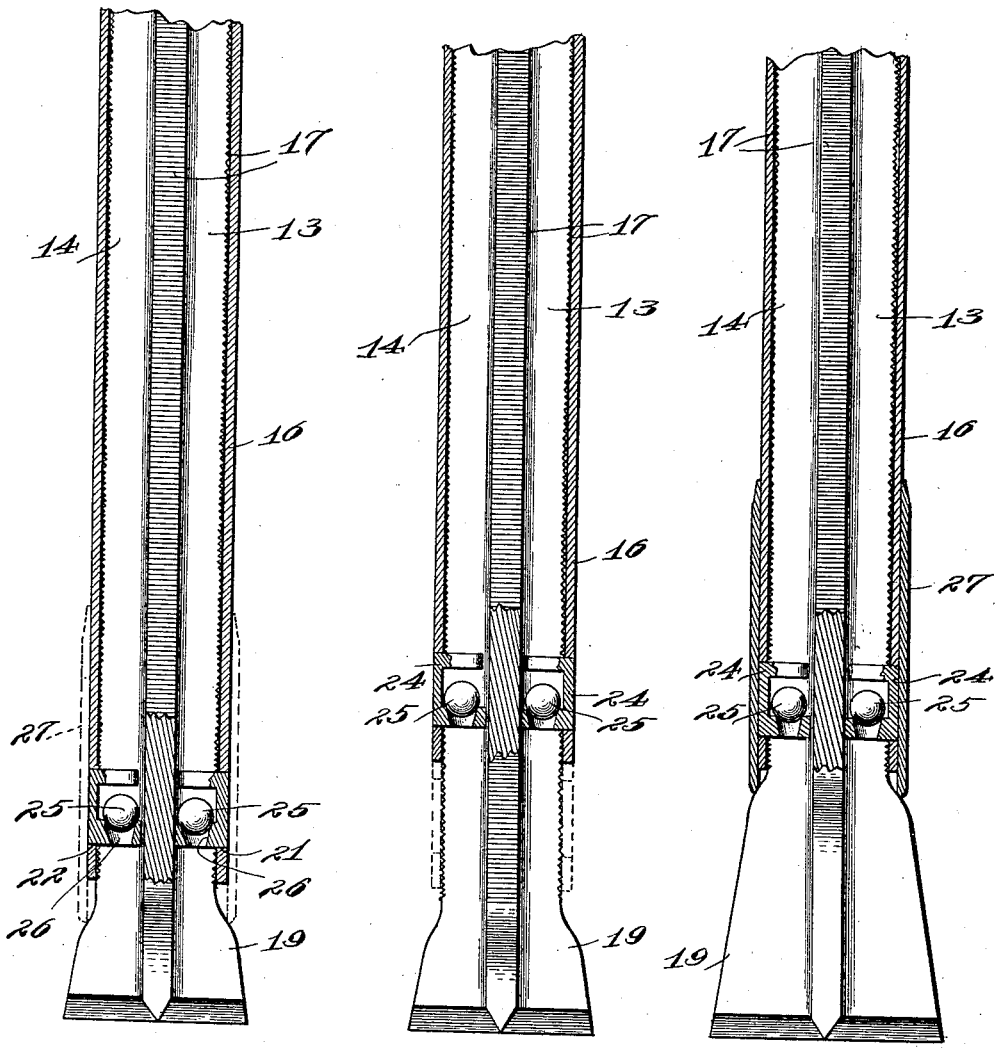

CHARLES H. LOCHER, OF GLASGOW, VIRGINIA.

METHOD OF RENEWING WORN DRILL-BITS.

1,051,900.  Specification of Letters Patent.  Patented Feb. 4, 1913.

Application filed January 7, 1911. Serial No. 601,399.

*To all whom it may concern:*

Be it known that I, CHARLES H. LOCHER, a citizen of the United States, residing at Glasgow, in the county of Rockbridge and State of Virginia, have invented certain new and useful Improvements in Methods of Renewing Worn Drill-Bits, of which the following is a specification.

My invention relates to a method of renewing rock-drills.

One of the objects of my invention is to provide a method of treating the drill and drill-carried parts in such a way that the structure so treated shall have all the characteristics of the original unworn structure, so that the practice of my invention upon drills may not disturb the intended relation of the cutting bit, the rod-engaging parts, such as a shell, and any parts, such as valves and the like, carried by the shell.

Other objects will become apparent to those skilled in the art from a consideration of the following description taken in conjunction with the drawing, wherein I have shown the application of my method to a drill which may be advantageously treated in accordance with the method herein described.

In said drawing, Figure 1 is a view, with parts in section and parts broken away, of a drill having a worn bit which it is desired to renew, the drill having also parts carried thereby, one of which is shown in dotted lines, to indicate its removal in accordance with my invention as applied to such particular drill; Fig. 2 is a similar view of the drill further treated in accordance with the invention; and Fig. 3 is a similar view of the drill after all steps have been carried out, this view also indicating how the drill appears originally before being worn.

My invention is intended for application to drills constructed to provide conduits between the rod and a rod-carried part and as a further refinement to such drills having other parts, such as valves or the like, carried by the shell at certain distance from the lower edge thereof.

The particular drill herein shown for purposes of indicating an application of my method to drills of this general nature, is particularly described in my copending application Serial No. 596,414, filed Nov. 22, 1910. The invention is, of course, applicable to other drills than that herein shown, but the drill disclosed in my copending application is particularly susceptible to such treatment and I have therefore shown it to disclose the method in its best environment.

In course of time and by much use the drill bit 19 will become worn away, about as represented in Fig. 1 when it becomes necessary to supply a new bit, substantially such as shown in Fig. 3. To this end I first remove the sleeve 27 by heating and peening to increase its diameter, or it may be divided longitudinally as by a cold chisel, after which the valves 25 and valve cages 24 are removed; and the jacket 16 is cut away, as shown in Fig. 2 to leave sufficient stock of the steel rod from which a new drill bit may be fashioned, as shown in Fig. 3. New holes are then drilled through the jacket for the reception of the valve structures, after which the sleeve 27 is replaced and shrunk thereon or a new one supplied. The renewed structure is shown complete in Fig. 3. This structure is substantially a duplication of that of the completed new structure before it was worn.

By this process of renewal the bits may be replaced from time to time without great expense, effecting considerable saving in material. When frequent renewal has reduced the length of the original rod other pieces of rod may be welded to the shortened rod and corresponding pieces of jacket may be supplied.

While I have herein described a single embodiment of my invention it is obvious that changes will readily be made in adapting the invention to the particular drill to be renewed. Thus where other parts than the valves are provided on the drill or valves are provided, but differently mounted, the herein described steps of my method which expose the rod above the bit will be accordingly changed in accordance with the spirit of the method described and within the scope of the appended claims.

What I claim is:

1. The art of renewing the bit formed at the exposed end of a shell-covered rod, which consists in removing the shell along a suitable length of the rod above the worn bit, and reforming the worn bit and newly exposed portion of the rod into a new bit.

2. The art of renewing drills which consists in removing the rod-carried parts thereof to expose a portion of the rod above the worn bit, and reforming the worn bit and newly exposed rod portion above said bit, into a new bit.

3. The art of renewing drills which consists in removing the rod-carried parts thereof to expose a portion of the rod above the bit equal in length, with the worn bit, to the length of a new bit, and reforming said worn bit and exposed portion above the worn bit, into a new bit.

4. The art of renewing drills which consists in removing the rod-carried parts thereof to expose a portion of the rod above the bit equal in length, with the worn bit, to the length of a new bit, reforming said worn bit and exposed rod portion above the worn bit into a new bit, and reforming the remaining rod-carried parts with respect to the new bit for reëstablishment of the original relation between all of the parts of the renewed drill as described.

In testimony whereof I hereunto set my hand in the presence of two witnesses.

CHARLES H. LOCHER.

In the presence of—
CARL R. McKENRICK,
J. A. SCHLEY.

---

Copies of this patent may be obtained for five cents each, by addressing the "Commissioner of Patents, Washington, D. C."